United States Patent [19]
Brody et al.

[11] Patent Number: 5,630,257
[45] Date of Patent: May 20, 1997

[54] VERSATILE ADJUSTABLE FASTENER SYSTEM

[75] Inventors: Scott D. Brody, Dedham, Mass.; J. Scott Nelson, Chico, Calif.

[73] Assignee: Tiger Products, Inc., Sharon, Mass.

[21] Appl. No.: 351,487

[22] Filed: Dec. 7, 1994

(Under 37 CFR 1.47)

[51] Int. Cl.⁶ ............................................... F16G 11/00
[52] U.S. Cl. ..................... 24/300; 24/130; 24/265 H
[58] Field of Search .................... 24/300, 265 H, 24/115 A, 301, 130, 129 W, 136 R

[56] References Cited

U.S. PATENT DOCUMENTS

| 269,399 | 12/1882 | Ensign | 24/130 |
|---|---|---|---|
| 904,747 | 11/1908 | Anderson | 24/130 |
| 1,452,338 | 4/1923 | Flowers | 24/130 |
| 2,296,082 | 9/1942 | Bierk | 24/130 |
| 4,361,938 | 12/1982 | Emery | 24/130 |
| 4,622,724 | 11/1986 | Dupre | 24/130 |
| 4,831,692 | 5/1989 | Chuan | 24/300 |
| 5,062,184 | 11/1991 | Rowland | 24/300 |
| 5,339,498 | 8/1994 | Parsons | 24/130 |

*Primary Examiner*—Victor N. Sakran
*Attorney, Agent, or Firm*—Morse, Altman & Benson

[57] ABSTRACT

A versatile adjustable fastener system for securing loads of widely varying geometries, sizes and weights to a variety of objects is disclosed. The system essentially includes an elastic rope of a given diameter and length and four accessories, preferably injection formed of a hard plastic. The first accessory features a double hook configuration. The other three accessories feature a tubular member provided with a specially-shaped flared opening and a second member integrally formed therewith selected from one of the group including another tubular member, a hook member and an anchoring member. In the double-tubular configuration, the use of the rope allows for three different ways to employ the same to fit specific attachments.

10 Claims, 9 Drawing Sheets

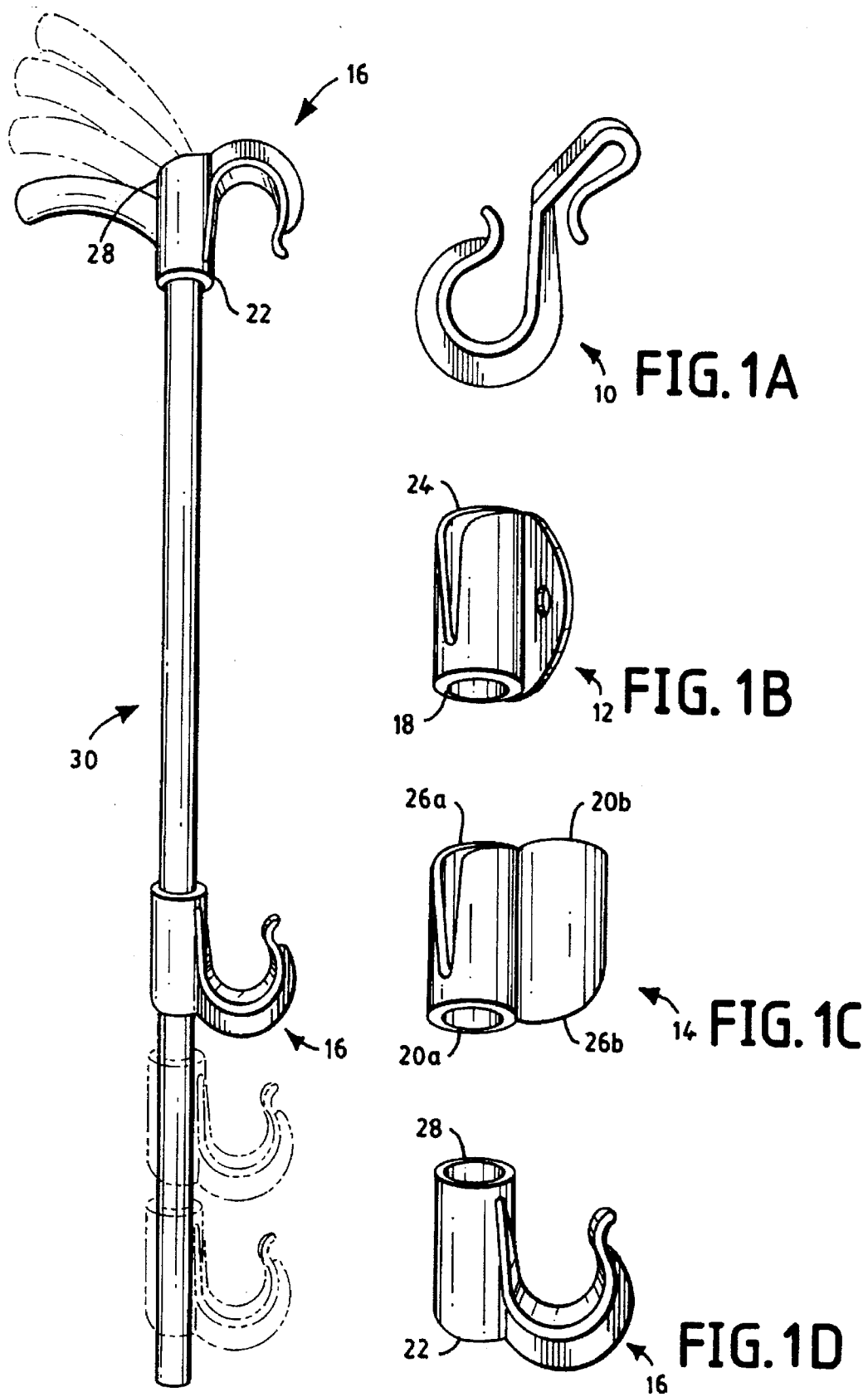

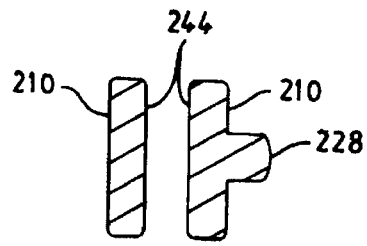
FIG. 16
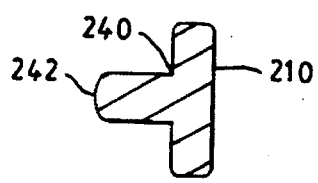
FIG. 17
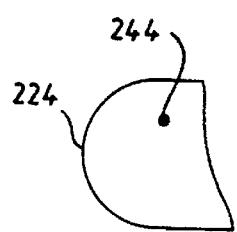
FIG. 18
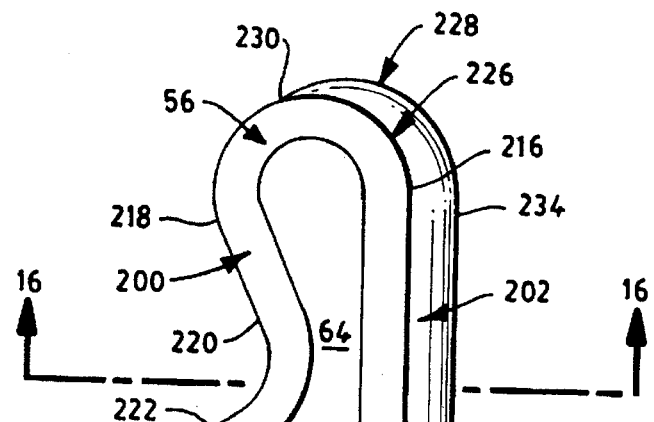
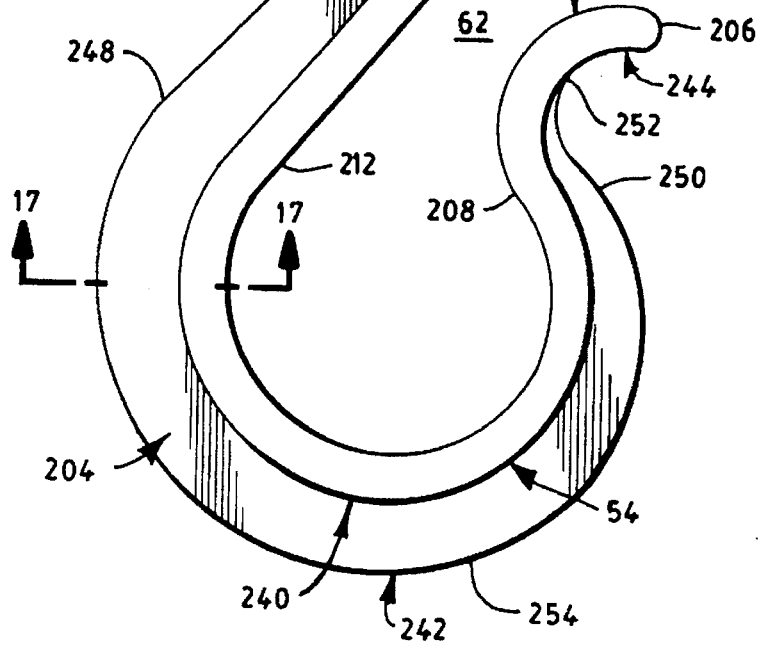
FIG. 15

VERSATILE ADJUSTABLE FASTENER SYSTEM

BACKGROUND OF THE INVENTION

1. Field of the Invention

The present invention relates generally to fastener systems and, more particularly, to a versatile adjustable fastener system to secure loads of widely differing geometries, sizes and weights to moving objects such as cars, boats, trucks and the like.

2. The Prior Art

Since time immemorial, man needed some system to secure items, be they twigs, furs, produce, etc., into bundles when transporting same between points of gathering, storage and/or use. With the discovery of the wheel and the advent of wagons, automobiles, boats and planes, a variety of ways to achieve the temporary securing of items to one another and/or to a means of conveyance have evolved. In today's world, a person's most trusted manner of securing items includes the use of a rope to tie items into bundles and an elastic rope to secure the bundles to a carriage of some kind, such as an automobile or truck. Such an elastic rope is exemplified by the bungee cord, an elasticized cord having hooks at both of its ends. The bungee cord also is used as a shock absorbing device, such as for planes on the deck of a aircraft carrier.

The bungee cord has a number of disadvantages. First is its lack of adjustability relative to the tension necessary to do the job. Since the hooks are permanently attached to each end of a fixed length of elastic cord, when a longer tie-down is needed, the cord must be stretched more, thus applying more pressure to the load than may be safe. Also, there is a fixed minimum length for the bungee cord that must be maintained to keep the hooks in place and the load secure.

In our present world where speed and mobility of both people and goods are at a premium, fasteners must possess a plurality of features to be of widespread practical use. The fasteners of today must be economical in manufacture, simple yet efficient in use, capable of re-use, and preferably useful in securing a wide variety of items of widely differing geometries, sizes and weights to various conveyances and in different and differing environments. That is a tall order that leaves plenty of room for improvements.

SUMMARY OF THE INVENTION

It is a principal object of the present invention to overcome the above disadvantages by providing a versatile adjustable fastener system designed for securing loads of widely ranging geometries, sizes and weights to each other and/or to a variety of conveyances, which system is simple yet excels in efficiency of use and re-use, and is economical in manufacture.

More specifically, it is an object of the present invention to provide a versatile adjustable fastener system that essentially includes two types of components: an elastic rope of a given diameter, length and strength and a plurality of accessories, formed of a hard plastic, such as 6,6 nylon, preferably by injection molding in a suitable mold. Each of the accessories is provided with means of unique shape and design to removably secure a section of the rope to one or more of the plurality of accessories. Three of the plurality of accessories feature a tubular member in which the means of unique shape and design to removably secure a section of the rope thereto comprises a flared opening formed in its tubular wall and having a frontal profile including an upper profile section gently flaring toward a lower profile section characterized by flaring substantially toward its end, and having a side profile being characterized by a gradually decreasing radius of curvature toward its end. Each of these three accessories further includes a second member integrally formed therewith as one of the group including: a second tubular member integrally joined to the first tubular member along overlapping peripheral sections albeit in opposed directions regarding their respective flared openings; a hook member, and an anchoring member, the former temporarily while the latter permanently to secure the accessory to another item. The fourth of the plurality of accessories is a specially designed "S" or "J" hook. In the double-tubular configuration, the use of the rope allows for three different ways to employ the same to fit specific tying needs and requirements.

Other and further objects of the present invention will in part be obvious and will in,part appear hereinafter.

The invention accordingly comprises the versatile adjustable fastener system of the present disclosure, its components, parts and their interrelationship, the scope of which will be indicated in the appended claims.

BRIEF DESCRIPTION OF THE DRAWINGS

For a fuller understanding of the nature and objects of the present invention, reference is to be made to the following detailed description, which is to be taken in connection with the accompanying drawings, wherein:

FIGS. 1A through 1D are perspective views of components of the versatile adjustable fastener system according to the invention;

FIG. 2 is a perspective view of one of the components illustrated in FIG. 1D in operative association with another component of the versatile adjustable fastener system according to the invention;

FIG. 15 is a longitudinal sectional view, on an enlarged scale, of the component illustrated in FIG. 1A;

FIG. 16 is a section taken along the line 16—16 of FIG. 15;

FIG. 17 is a section taken along the line 17—17 of FIG. 15; and

FIG. 18 is a section taken along the line 18—18 of FIG. 15.

DETAILED DESCRIPTION OF THE PREFERRED EMBODIMENTS

Figure 3:
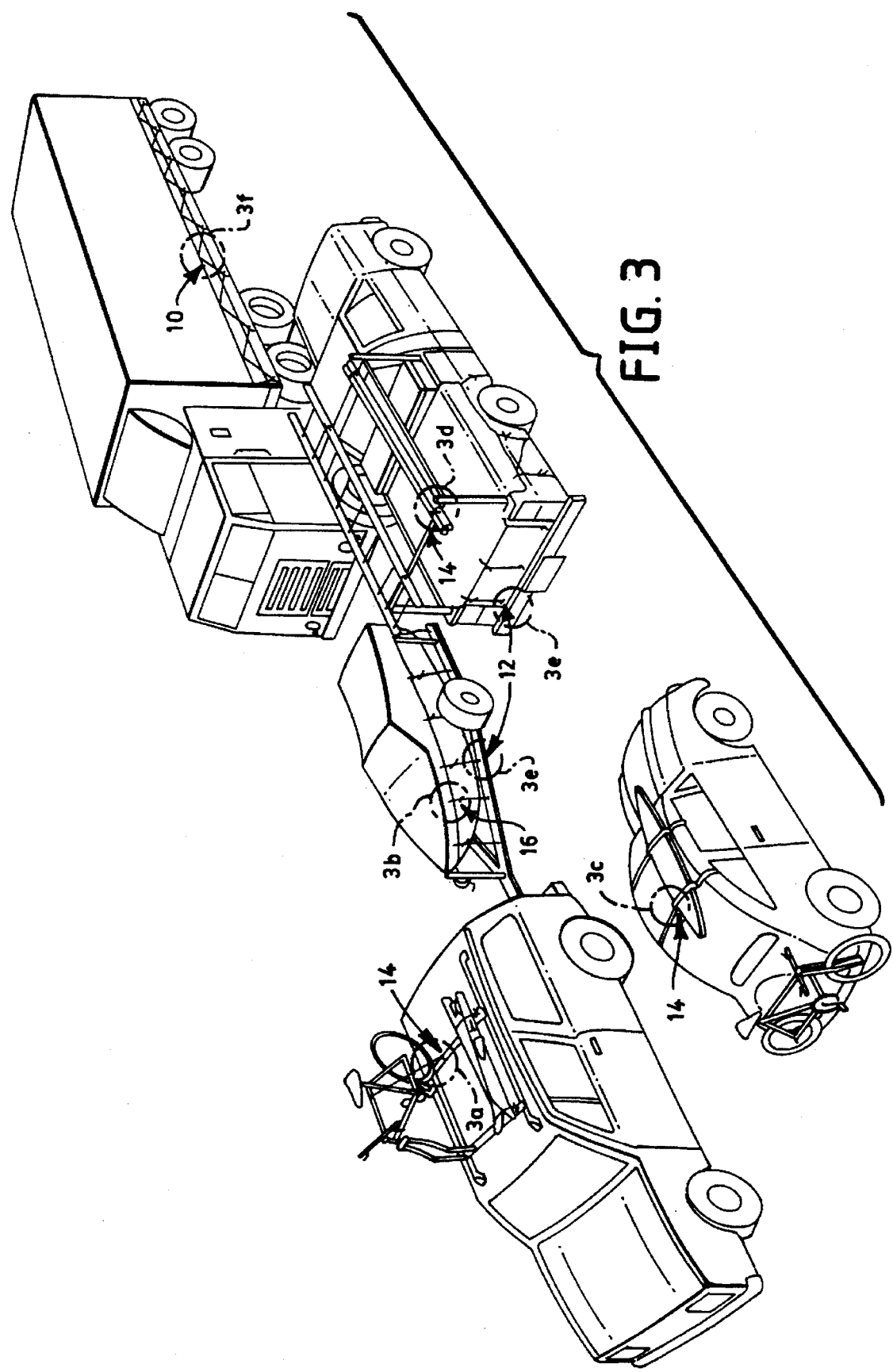
FIGS. 3 and 3a through 3f are a schematic illustration, in perspective, of some of the uses of the versatile adjustable fastener system according to the invention.

In general, the present invention pertains to a versatile adjustable fastener system for securing loads of widely varying geometries, sizes and weights to a variety of moving objects. The system essentially includes an elastic rope of a given diameter and length and four accessories, preferably injection formed of a hard plastic. Three of the four accessories feature a tubular member provided with a specially-shaped flared opening and a second member integrally formed therewith of one of the group including another tubular member, a hook member and an anchoring member. Preferably, the hard plastic material is a 6,6 nylon (polyhexamethylene adipamide), manufactured by the ALBIS PLASTIC G.m.b.H., Hamburg, Germany, under the designation "ALBIS POLYAMID 66 PA 150/1." Preferably, the hard plastic accessories can be effectively used over a temperature range from about −40° F. to about +220° F. These hard plastic accessories also are corrosion resistant, resistant to ultraviolet light, ozone, salty air and salt water, chemical corrosion, and further are electrically non-conductive.

Preferably, the elastic rope is formed of natural or synthetic rubber, such as ethylene-propylene-dilene ASTM terpolymer class M material, which is a synthetic rubber compound with special additives preventing deterioration from ultraviolet light, ozone, salt water and air, petroleum products and most caustic chemicals. Preferably, the elastic rope has a diameter from about 9 mm to about 11 mm and comes with a length from at least about 10 m to about 50 m and it can be cut to any desired length. Preferably, the elastic rope can be effectively used over a temperature range from about −40° F. to about +300° F.

In the double-tubular configuration of the accessory, the use of the plastic rope allows for three different ways to employ the fastener system of the invention to fit specific attachment requirements. The versatile adjustable fastener system also is safe to handle as it will not puncture or abrade a user's skin or items being secured thereby.

FIGS. 1A–1D AND FIG. 2—THE COMPONENTS OF THE SYSTEM

The versatile adjustable fastener system of the invention essentially comprises two types of components: a specially engineered elastic rope and a plurality of accessories made from a hard plastic material, such as 6,6 nylon.

FIGS. 1A through 1D are perspective views of the four hard plastic components of the system: a "J" hook 10 in FIG. 1A; an anchor member 12 in FIG. 1B; an extender member 14 in FIG. 1C; and a hook member 16 in FIG. 1D.

Except for the "J" hook 10, each of the other three plastic accessories comprises at least one tubular portion 18, 20 and 22, respectively. Each of these tubular portions 18, 20 and 22, is in turn provided with a flared opening 24, 26, 28, respectively. The dimensions, shapes and sizes of both the respective tubular portions 18, 20 and 22 and of the respective flared openings 24, 26 and 28 are identical to one another.

FIG. 2 is a perspective view of a specially engineered elastic rope 30 illustrated in operative association with two hook members 16. The upper end of the rope 30 illustrates, first in phantom, the securing thereof in the flared opening 28 of its tubular portion 22. The rope 30 is formed of natural or synthetic rubber, preferably of ethylene-propylene-dilene ASTM terpolymer class M material, and with a preferred diameter from at least about 9 mm to about 11 mm. Preferably, the rope 30 has an operating range of temperature from about −40° F. to about +300° F., is ozone and corrosion resistant and possesses a safe stretch length of at least about 200% of the length of the rope 30 in its relaxed state.

The end of the rope 30 is securely, albeit releasably, anchored within the flared opening 28 due to the specially designed shape, size and configuration of the flared opening 28, as more fully described below.

The extender member 14 of FIG. 1C is formed of two tubular portions 20a and 20b but facing in opposed directions. Each tubular portion 20a and 20b is, in turn provided with its flared opening 26a and 26b, also facing in opposing directions.

FIGS. 3 and 3a and 3a–3f—ILLUSTRATIVE USES OF THE SYSTEM

Figure 3A:
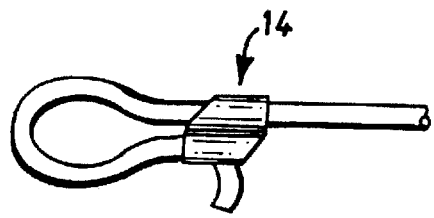
Figure 3B:
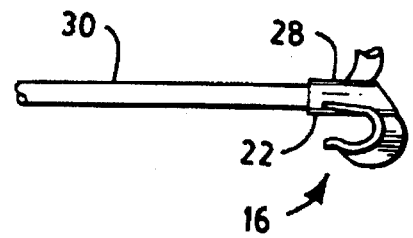

The versatility of the adjustable fastener system of the invention is illustrated, in perspective, in FIGS. 3 and 3a and 3a–3f. The basics of the system, comprising the rope 30, one hook member 16 and an extender member 14, are illustrated in FIGS. 3a and 3b. Preferably, the length of the rope 30 is about 150 feet and is, of course, cut to the desired length. By pulling one end of the rope 30 into the flared opening 28 of the hook member 16, one can easily select just the right length and tension for the system, be it to secure a bike to an overhead frame or a tarpaulin to a boat. As illustrated, the extender member 14 allows the rope 30 to be used as a "slip-knot", to make the system adaptable to nearly any situation.

Figure 3C:
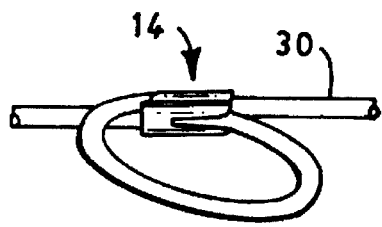
Figure 3D:
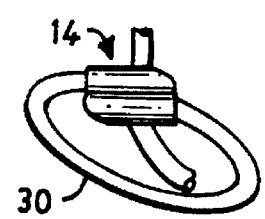

A further use of the extender member 14 is illustrated FIG. 3c. In this illustration, a large item such as a surfboard, is fastened on top of an automobile, with the rope 30 fully encircling the large item, hence dubbed the "full circle" mode for the extender member 14 of the fastening system according to the invention. A similar "loop" configuration is illustrated for the extender member 14 in FIG. 3d.

Figure 3E:
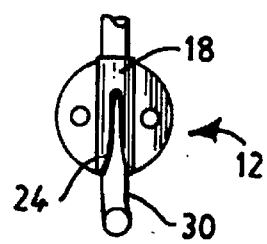
Figure 3F:
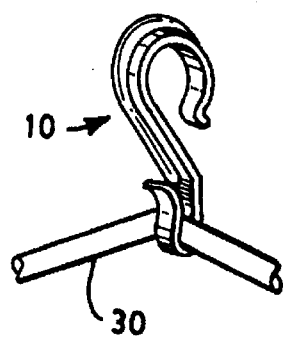

A use of the anchor member 12 is illustrated in FIG. 3e. The anchor member 12 is shown permanently secured, via a pair of screws not shown, to a trailer or a truck. The anchor member 12 is designed to secure, releasably, one end of the rope 30 at that location. Finally, one use of the "J" hook 10 (which also can be described as an "S" hook) is illustrated FIG. 3f. As may be observed, one end of the "J" hook 10 is secured in an eyelet of a tarpaulin of a truck, with the rope 30 riding in the other end of the "J" hook 10.

FIGS. 4A–4C—THREE USES FOR THE EXTENDER MEMBER

Figure 4A:
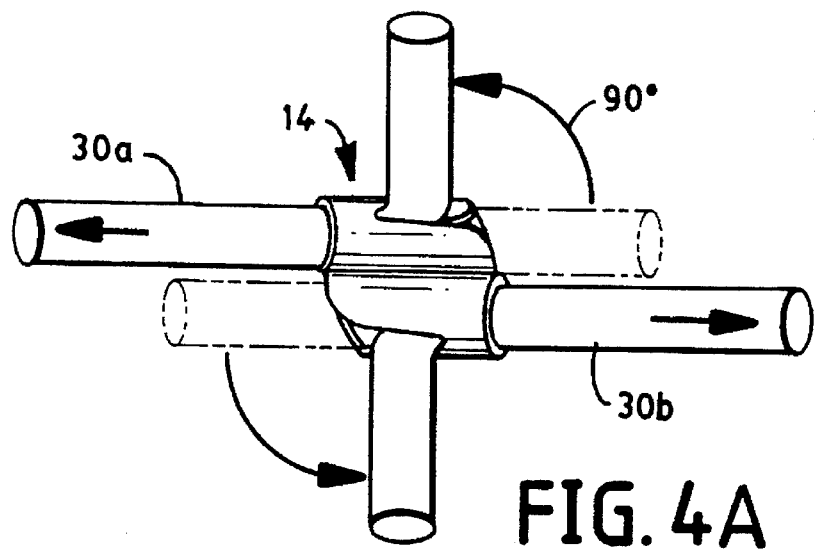
FIGS. 4A through 4C are schematic illustrations, in perspective, of one of the components illustrated in FIG. 1C, in its three different operative modes according to the invention.
Figure 4B:
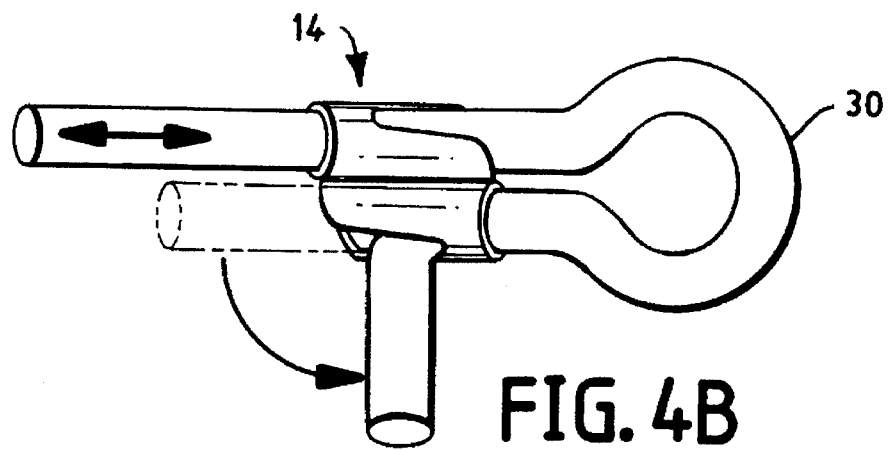
Figure 4C:
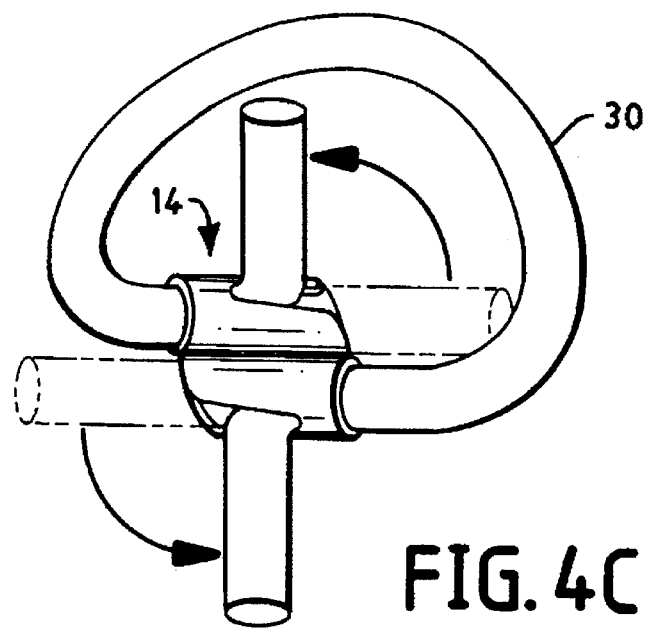

The three different configurational uses to fit varying fastening modes of the extender member 14 of the fastening system according to the invention are schematically illustrated in FIGS. 4A through 4C.

Two of these three configurational uses, the "slip-knot" of FIG. 4B and the "full circle" of FIG. 4C, already have been illustrated and briefly described with reference to FIG. 3.

A third configurational use, known as the "splice" mode, for the extender member 14 is illustrated schematically in FIG. 4A. In this splice mode, the user can splice the ends of two short ropes 30a and 30b together so as to extend the operative length of the resultant rope.

FIGS. 5–9—THE EXTENDER MEMBER

Figure 5:
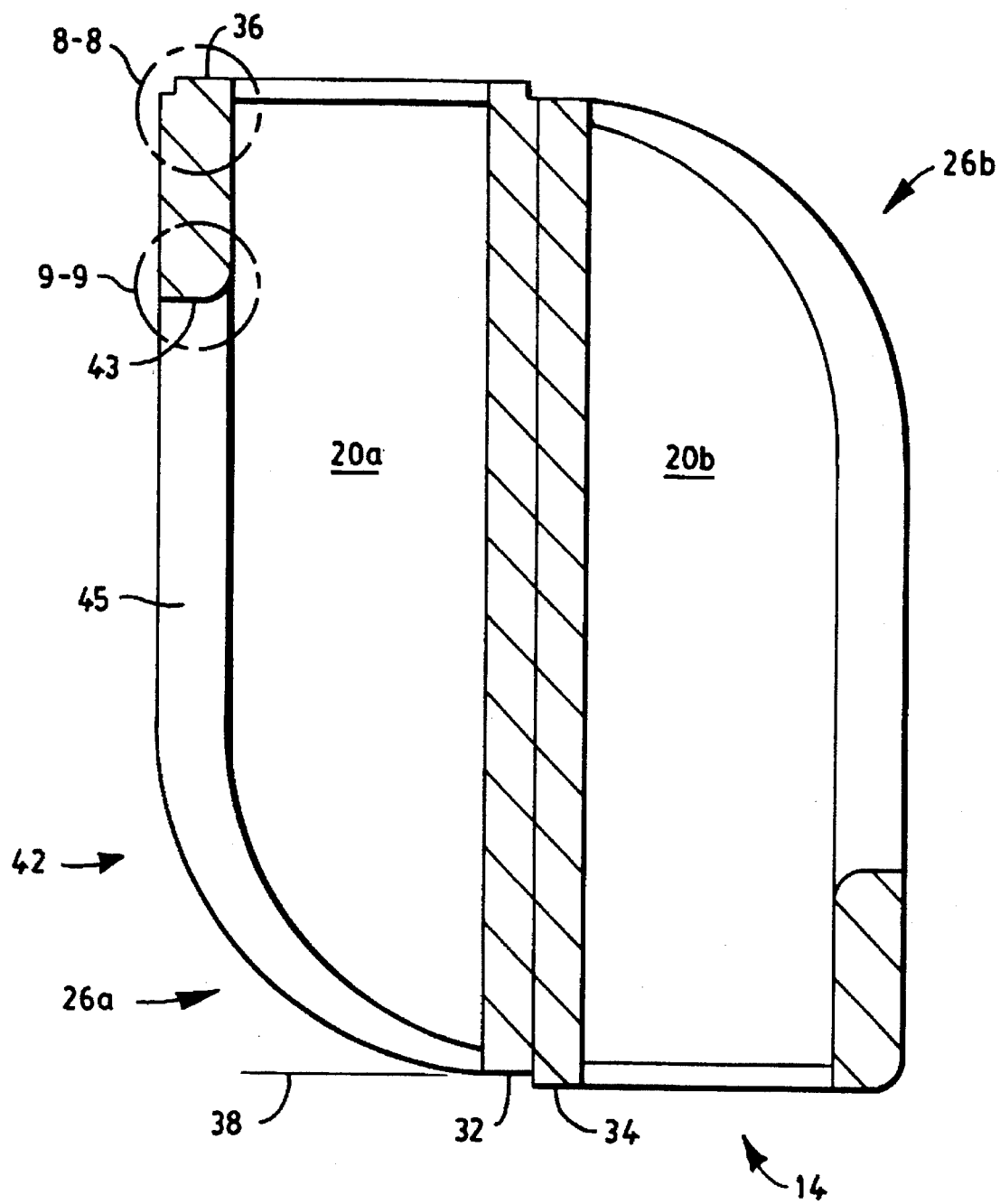
FIG. 5 is a longitudinal sectional view, on an enlarged scale, of the component illustrated in FIG. 1C.

FIG. 5 is a longitudinal sectional view, on an enlarged scale, of the extender member 14 illustrated in perspective in FIG. 1C. As mentioned, the extender member 14 essentially comprises a pair of tubular portions 20a and 20b integrally joined to one another at common axial sections 32 and 34, with the tubular portions 20a and 20b facing in opposed directions. Each of the tubular portions 20a and 20b is provided with its respective flared openings 26a and 26b.

Figure 8:
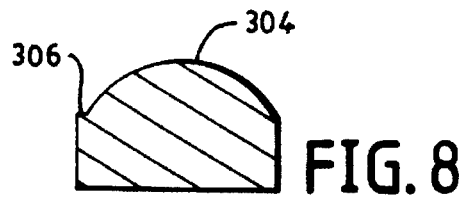
FIG. 8 is a fragmentary section, on an enlarged scale, of the component of FIG. 5 shown within a circle marked 8—8.

The tubular portions 20a and 20b preferably are formed with tubular walls of about 3 mm thickness and extending about 44 mm between a proximal end 36 and a distal end 38 thereof. As in FIG. 8, at the edge of the proximal end 36, is a shoulder 306 of width about 0.1 mm normal to the outer wall the of tubular portion 20a. From the inner end of the shoulder 306 is a convex portion 304 to the inner wall of the tubular portion 20a. The radius of curvature of the convex portion is about 1.8 mm.

Figure 6:
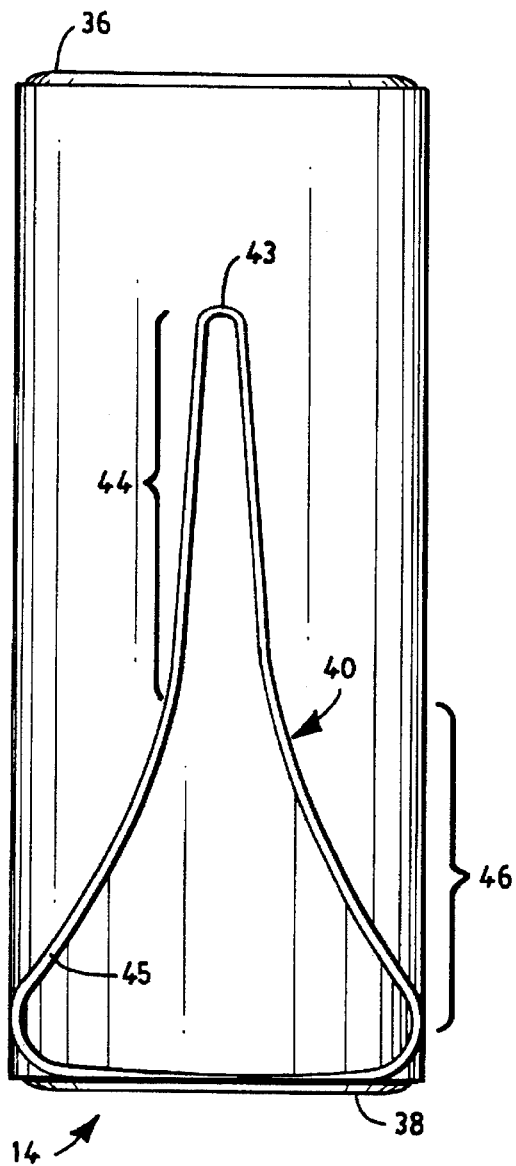
FIG. 6 is an elevational view of the component shown in FIG. 5 when viewed from the left thereof.
Figure 7:
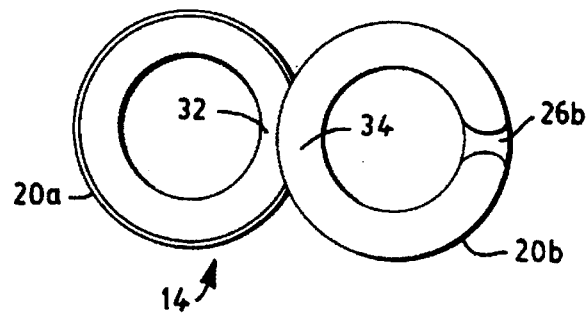
FIG. 7 is a plan view of the component shown in FIG. 5.

Each of the flared openings 26a and 26b commences from a closed end 43 at a distance of about 10 mm from the proximal end 36 and extends all the way to the distal end 38, note FIG. 6, which illustrates a frontal profile 40 of the flared opening 26a. The flared opening 26a increases in width in a curved manner symmetrically about a central line parallel to the axis of the cylinder. As at 44, the flared opening 26a increases from about 1.59 mm at the closed end 43, to about 2 mm at a point 5 mm from the closed end 43, to about 2.63 mm at a point 10 mm from the closed end 43, to about 3.25 mm at a point 15 mm from the closed end 43, to about 5.63 mm at a point 20 mm from the closed end 43. From this point, as at 46, the flared opening 26a increases width more rapidly with a radius of about 20.63 mm until, at the distal end 38, its width is the diameter of the distal end 38.

Figure 9:
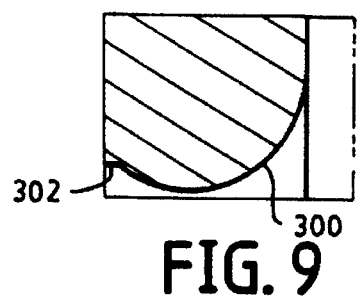
FIG. 9 is a fragmentary section, on an enlarged scale, of the component of FIG. 5 shown within a circle marked 9-9.

As in FIG. 9, at the closed end 43, is a shoulder 302 of width about 0.1 mm normal to the outer wall the of tubular portion 20a. From the inner end of the shoulder 302 is a convex portion 300 to the inner wall of the tubular portion 20a. The radius of curvature of the convex portion is about 2.2 mm.

Concurrently with the increase in width of the flared opening 26a, the flared opening edge 45 gradually changes planes from parallel to the axis of the tubular portion 20a at the closed end 43 to coincident with the edge of the distal end 38, thus normal to the axis of the tubular portion 20a.

An illustrated side profile 42 of the flared opening 26a is best observed in FIG. 5.

The side profile 42, observe FIG. 5, initially (i.e., adjacent to axial section 32) is sloping at about a 15° angle from the distal end 38, and then gradually changing to a radius of curvature of about 16.25 mm, and then on to a radius of curvature of about 20.63 mm at a point when nearly diametrical to its axial connecting section 32.

The flared opening 26b has the same dimensions as flared opening 26a.

FIGS. 10–11 THE HOOK MEMBER

Figure 10:
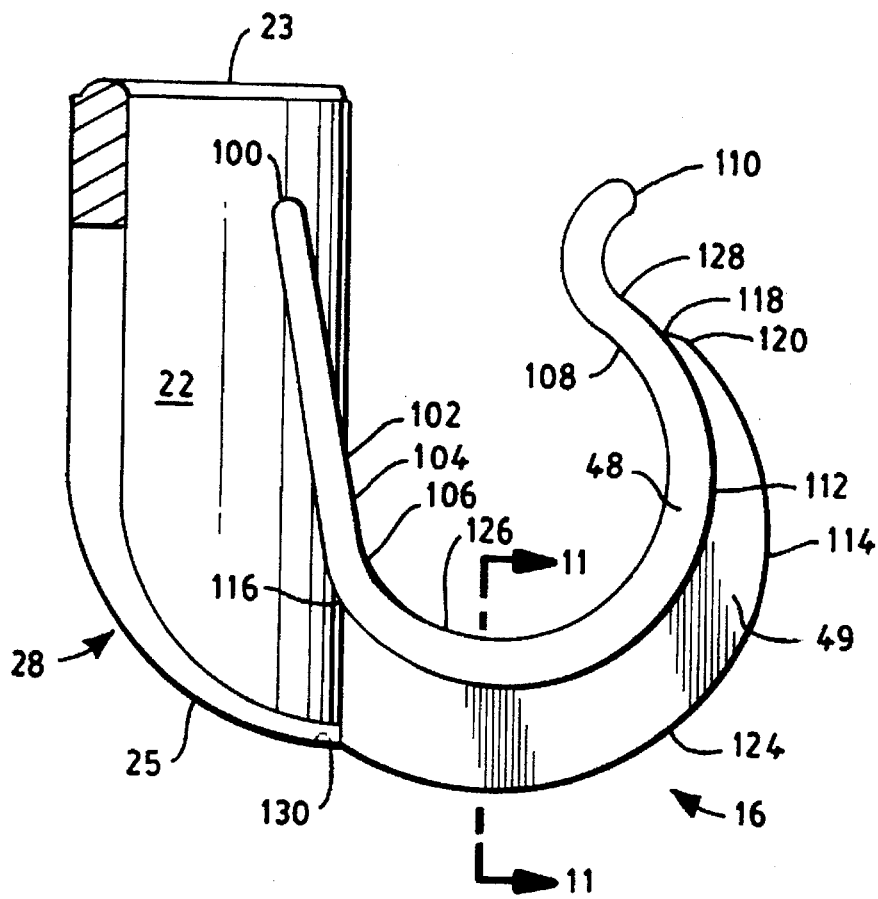
FIG. 10 is a longitudinal sectional view, partly in elevation, on an enlarged scale, of the component illustrated in FIG. 1D.
Figure 11:
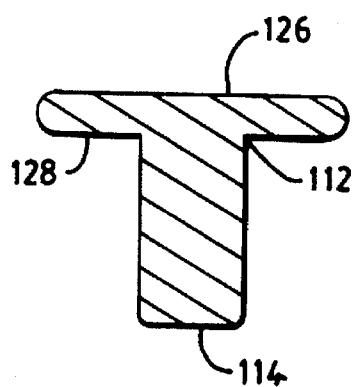
FIG. 11 is a section of the component of FIG. 10 taken along the line 11—11.

FIG. 10 is a longitudinal sectional view, partly in elevation, on an enlarged scale, of the hook member 16 illustrated in perspective in FIG. 1D. Hook member 16 is formed with but one tubular portion 22, also provided with its flared opening 28, and an integral hook portion 48 and an integral rib portion 49, formed at a section diametrically opposed to the flared opening 28. The flared opening 28 is of the same size and shape as the flared opening 26a of the extender member 14 shown in and described with reference to FIG. 6.

The hook portion 48 has a curvilinear shape and a constant thickness of about 2.6 mm until about 1.3 mm from the tip 110. At about 1.3 mm from the tip 110, the thickness decreases in a semicircular curve of radius about 1.3 mm. As at 100, the hook portion 48 is attached to the tubular portion 22 at a point about 7 mm from the proximal end 23 in a line parallel to the axis of the tubular portion 22 and about 125° around from the center line of the flared opening 28. As at 100, the width of the hook portion 48 is about 17 mm and decreases in width to about 6 mm at about 2.5 mm from the tip 110. At about 2.5 mm from the tip 110, the width decreases in a semicircular curve of radius about 5 mm.

Beginning at point 100, the inner surface of the hook portion 126 extends linearly away from the proximal end 23 at an angle of about 11° from the axis of the tubular portion 22 for a distance of about 18.3 mm to point 102. The inner surface 126 then curves closer to parallel to the axis of the tubular portion 22 at a radius of about 14.6 mm to point 104. The inner surface 126 then immediately reverses the curve with a radius of about 8.6 mm through an angle of about 45° to point 106. The curve continues with a radius of about 11.5 mm through an angle of about 180° to point 108. The inner surface 126 reverses the curve with a radius of about 6 mm through an angle of approximately 90° to about 1.5 mm from the tip 110.

The rib portion 49 has an inner edge 112 and an outer edge 114. The rib portion 49 is symmetrical about the plane that bisects the hook portion 48 through its width, and is about 4.5 mm thick, except at the outer edge 114, where it forms a semicircular curve of about a 3 mm radius. The inner edge 112 is coincident with the outer surface 128 of the hook portion 48 from the point on the outer surface 128 where it intersects with the tubular wall of the tubular portion 22, as at point 116 to a point opposite the final curve of the inner surface 126, as at point 118. The outer edge 114 follows a curvilinear path, beginning at the distal end 25, as at point 130, at an angle of about 105° from the tubular wall of the tubular portion 22. The outer edge 114 curves with a radius of about 17 mm through an angle of about 90° to point 124. The curve continues with a radius of about 20 mm through an angle of about 45° to point 120. The curve continues with a radius of about 2 mm until the outer edge 114 makes contact with the outer surface 128 at point 118.

FIGS. 12–14—THE ANCHOR MEMBER

Figure 12:
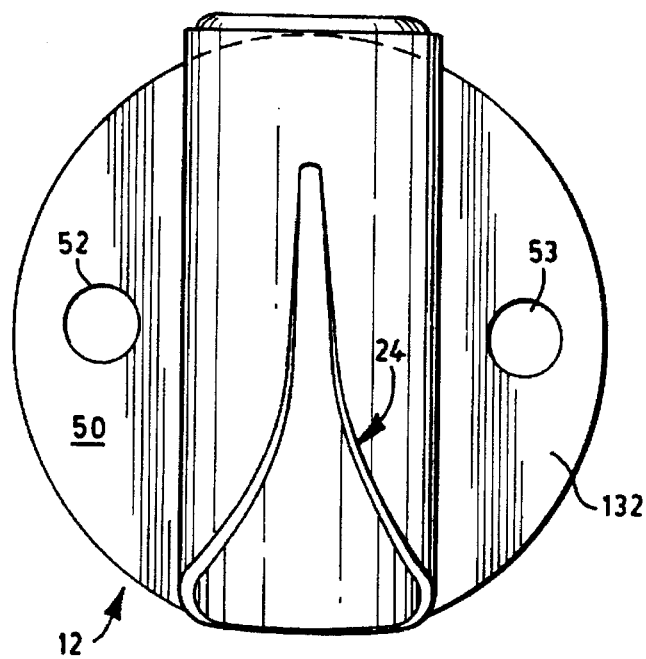
FIG. 12 is a plan view, on an enlarged scale, of the component illustrated in FIG. 1B.
Figure 14:
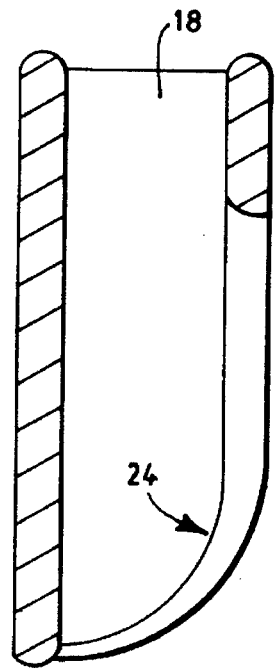
FIG. 14 is a longitudinal section of the component of FIG. 12.

FIG. 12 is a plan view, on an enlarged scale, of the anchor member 12 illustrated in perspective in FIG. 1B. Anchor member 12 also is formed with its tubular portion 18 provided with its flared opening 24 which is identical in size and shape with the flared opening 26a of the extender member 14, see FIG. 6. Anchor member 12 is furthermore provided with an integral anchoring portion 50, shown as a circular disc. With screws, the anchor member 12 can be permanently affixed to a rack, a trailer, a truck side or a recreational vehicle, as desired.

The anchoring portion 50 has a diameter of about 43.0 mm and a thickness of about 3.3 mm. Anchoring portion 50 has two mounting holes 52, 53, each with a diameter of about 5.4 mm, that go through the anchoring portion 50 from the front face 132 to the rear face 130. The centers of the mounting holes 52, 53 are located on a diameter line, the center of the first hole 52 being about 5.75 mm from the edge of the anchoring portion 50 and the center of the second hole 53 being about 30.5 mm from the center of the first hole 52.

Figure 13:
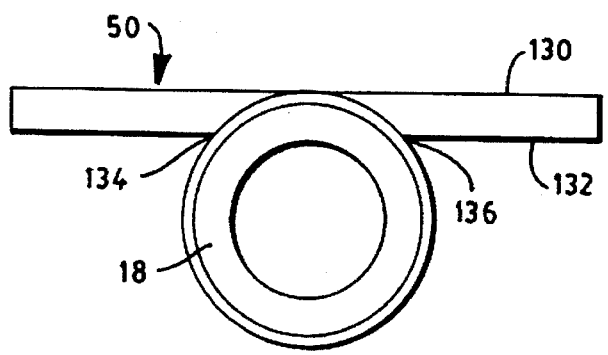
FIG. 13 is a view from the top of the component of FIG. 12.

As in FIG. 13, the anchoring portion 50 is attached tangentially to the tubular portion 18 at a line parallel to the axis of the tubular portion 18 and opposite the center line of the flared opening 24. The attachment point on the anchoring portion 50 is a diameter line about perpendicular to the line of the mounting holes 52, 53. The outer surface of the tubular portion 18 is in contact with the rear face 130. As at 134, 136, the front face 132 is discontinuous at the tubular portion 18.

FIGS. 15–18—THE "J" HOOK MEMBER

The fourth and final plastic accessory of the versatile adjustable fastener system of the invention is the "J" hook 10 illustrated in perspective in FIG. 1A. The "J" hook 10 is the only accessory that has no tubular portion or flared opening. Rather, it is formed with opposed and integral hook segments. As in FIG. 15, the "J" hook 10 has three components: a hook portion 200, a small rib portion 202, and a large rib portion 204.

The hook portion 200 has a curvilinear shape with a constant thickness of about 2.8 mm until about 1.4 mm from the end points 206, 224, where the thickness decreases in a semicircular curve with a radius of about 1.4 mm. The width of the hook portion 200 is nearly constant throughout its length at about 10.8 mm until about 5.4 mm from the end points 206, 224, where the width decreases in a semicircular curve with a radius of about 6 mm, as in FIG. 18. Beginning at 1.4 mm from the end point 206, the first surface of the hook portion 210 curves with a radius of about 8.3 mm through an angle of about 100° to point 208. The first surface 210 immediately reverses the curve with a radius of about 9.7 mm through an angle of about 215° to point 212. The first surface 210 then extends linearly for a length of about 24 mm to point 214. The first surface 210 then turns at an angle of about 38° opposite the direction of the previous curve and extends linearly for a length of about 23 mm to point 216. The first surface 210 then curves in the same direction as the previous angle with a radius of about 5.8 mm through an angle of about 203° to point 218. The first surface 210 then extends linearly for a length of about 8 mm to point 220. The first surface 210 then curves in the opposite direction from the previous curve with a radius of about 6 mm through an angle of about 78° to point 222. The first surface 210 then extends linearly for a length of about 6.4 mm to about 1.4 mm from the end point 224.

The small rib portion 202 has a small rib inner edge 226 and a small rib outer edge 228. The small rib portion 202 is symmetrical about the plane that bisects the hook portion 200 through its width, and is about 3.8 mm thick, except at the small rib outer edge 228, where it forms a semicircular curve of about a 3 mm radius, as in FIG. 16. The small rib inner edge 226 is coincident with the first surface 210 from the 38° turn of the first surface 214 to about halfway along the 5.8 mm radius curve of the first surface 230. The small rib outer edge 228 follows a curvilinear path beginning at the 38° turn of the first surface 214, extending linearly from the first surface 210 for a length of about 5.6 mm to point 232. The small rib outer edge 228 then turns at an angle of about 38° toward the first surface 210 and extends linearly for a length of about 19 mm to point 234. The small rib outer edge 228 then curves toward the first surface 210 with a radius of about 7.2 mm until the small rib outer edge 228 makes contact with the first surface 210 at point 230.

The large rib portion 204 has a large rib inner edge 240 and a large rib outer edge 242. The large rib portion 204 is symmetrical about the plane that bisects the hook portion 200 through its width, and is about 3.8 mm thick, except at the large rib outer edge 242, where it forms a semicircular curve of about a 3 mm radius, as in FIG. 17. The large rib inner edge 240 is coincident with the second surface of the hook portion 244 from point 246 to point 252. The large rib outer edge 242 follows a curvilinear path beginning at a point on the second surface 244 about 8 mm from the end point 206, as at point 252, curving away from the second surface 244 with a radius of about 5 mm through an angle of about 90° to point 250. The large rib outer surface 242 then reverses the curve with a radius of about 15.5 mm through an angle of about 130° to point 254. The large rib outer edge 242 continues the curve with a radius of about 17.7 mm through an angle of about 137° to point 248. The large rib outer edge 242 then extends linearly until making contact with the second surface 244.

As illustrated and described with reference to FIG. 3, the large hook segment 54 of the "J" hook 10 can be secured within an eyelet of a tarpaulin, with the elastic rope 30 being frictionally engaged within the small hook segment 56 of the "J" hook 10. Both ends 206, 224 of the "J" hook 10 are yieldable to enlarge the respective openings 62 and 64 from the indicated respective sizes of about 2.8 mm and about 7 mm to at least about twice and preferably three times the resting size thereof.

Thus it has been shown and described a versatile adjustable fastener system designed to secure loads of widely differing geometries, sizes and weights to moving objects, which system satisfies the objects and advantages set forth above.

Since certain changes may be made in the present disclosure without departing from the scope of the present invention, it is intended that all matter described in the foregoing specification or shown in the accompanying drawings, be interpreted in an illustrative and not in a limiting sense.

What is claimed is:

1. A versatile adjustable fastener system comprising:
   (a) at least one elastic rope, wherein said rope has a substantially circular cross-section with a diameter selected from the class consisting about 9 mm and about 11 mm, and is composed of a synthetic rubber compound;
   (b) a plurality of accessory members comprising a tubular portion and a second portion selected from the class consisting of another tubular portion, a hook portion, and an anchor portion; wherein said accessory member composed of a first tubular portion and a second tubular portion is called an extender member, said accessory member composed of a tubular portion and a hook portion is called a hook member, and said accessory member composed of a tubular portion and an anchor portion is called an anchor member;
   (c) wherein said tubular portion has walls about 3 mm thick and extends about 44 mm from a proximal end to a distal end;
   (d) wherein said tubular portion includes a flared opening in the wall, having a closed end about 10 mm from said distal end and increasing gradually in width symmetrically about a central line parallel to the axis of said tubular portion from about 1.59 mm at said closed end to the width of said tubular portion at said distal end;
   (e) wherein the edge of said flared opening gradually changes planes from parallel to the axis of said tubular portion at said closed end to coincident with the edge of said distal end;
   (f) wherein the side profile of said flared opening slopes gradually from said distal end, gradually changing the radius of curvature until said profile becomes coincident with said outer wall of said tubular portion;
   (g) wherein said second tubular portion of said extender member is integrally joined to said first tubular portion such that said distal end of said first tubular portion is adjacent to said proximal end of said second tubular portion and said first tubular portion flared opening and said second tubular portion flared opening are opposed;
   (h) wherein said hook portion of said hook member includes a hook element and a rib element; wherein said hook element has substantially an "S" shape and a constant thickness of about 2.6 mm; wherein said hook element is attached to said tubular portion at a point about 7 mm from said proximal end in a line parallel to the axis of said tubular portion and about 125° around from the center line of said flared opening; wherein the width of said hook element is about 17 mm and decreases in width to about 6 mm;

(i) wherein said rib element has an inner edge and an outer edge, wherein said rib element is symmetrical about the plane that bisects said hook element through its width, and is about 4.5 mm thick; wherein said rib element inner edge is coincident with said hook element outer surface from the point on said hook element outer surface where it intersects with said outer wall of said tubular portion to a point opposite said final curve of said hook element inner surface; wherein said rib element outer edge follows a curvilinear path;

(j) wherein said anchor portion of said anchor member is a disk with a first mounting hole and a second mounting hole;

(k) wherein said disk is attached tangentially to said tubular portion opposite the center line of said flared opening;

(l) at least one J-hook member including a J-hook portion, a small rib portion, and a large rib portion;

(m) wherein said J-hook portion has a substantially "S" shape with a constant thickness from a first surface to a second surface of about 2.8 mm; wherein the width of said J-hook portion is substantially constant throughout its length at about 10.8 mm;

(n) wherein said small rib portion has a small rib inner edge and a small rib outer edge; wherein said small rib portion is symmetrical about the plane that bisects said J-hook portion through its width, and is about 3.8 mm thick; wherein said small rib inner edge is coincident with said J-hook first surface; wherein said small rib outer edge follows a curvilinear path;

(o) wherein said large rib portion has a large rib inner edge and a large rib outer edge; wherein said large rib portion is symmetrical about the plane that bisects said J-hook portion through its width, and is about 3.8 mm thick; wherein said large rib inner edge is coincident with said J-hook second surface; wherein said large rib outer edge follows a curvilinear path;

(p) wherein said extender member, said hook member, said anchor member, and said J-hook member are composed of a hard plastic.

2. A hook accessory member comprising:

(a) a tubular portion and a hook portion;

(b) wherein said tubular portion has walls about 3 mm thick and extends about 44 mm from a proximal end to a distal end;

(c) wherein said tubular portion includes a flared opening in the wall, having a closed end about 10 mm from said distal end and increasing gradually in width symmetrically about a central line parallel to the axis of said tubular portion from about 1.59 mm at said closed end to the width of said tubular portion at said distal end;

(d) wherein the edge of said flared opening gradually changes planes from parallel to the axis of said tubular portion at said closed end to coincident with the edge of said distal end;

(e) wherein the side profile of said flared opening slopes gradually from said distal end, gradually changing the radius of curvature until said profile becomes coincident with said outer wall of said tubular portion;

(f) wherein said hook portion includes a hook element and a rib element; wherein said hook element has substantially an "S" shape and a constant thickness of about 2.6 mm; wherein said hook element is attached to said tubular portion at a point about 7 mm from said proximal end in a line parallel to the axis of said tubular portion and about 125° around from the center line of said flared opening; wherein the width of said hook element is about 17 mm and decreases in width to about 6 mm;

(g) wherein said rib element has an inner edge and an outer edge, wherein said rib element is symmetrical about the plane that bisects said hook element through its width, and is about 4.5 mm thick; wherein said rib element inner edge is coincident with said hook element outer surface from the point on said hook element outer surface where it intersects with said outer wall of said tubular portion to a point opposite said final curve of said hook element inner surface; wherein said rib element outer edge follows a curvilinear path;

(h) wherein said hook member is composed of a hard plastic.

3. A J-hook accessory member comprising:

(a) a J-hook portion, a small rib portion, and a large rib portion;

(b) wherein said J-hook portion has a substantially "S" shape with a constant thickness from a first surface to a second surface of about 2.8 mm; wherein the width of said J-hook portion is substantially constant throughout its length at about 10.8 mm;

(c) wherein said small rib portion has a small rib inner edge and a small rib outer edge; wherein said small rib portion is symmetrical about the plane that bisects said J-hook portion through its width, and is about 3.8 mm thick; wherein said small rib inner edge is coincident with said J-hook first surface; wherein said small rib outer edge follows a curvilinear path;

(d) wherein said large rib portion has a large rib inner edge and a large rib outer edge; wherein said large rib portion is symmetrical about the plane that bisects said J-hook portion through its width, and is about 3.8 mm thick; wherein said large rib inner edge is coincident with said J-hook second surface; wherein said large rib outer edge follows a curvilinear path;

(e) wherein said J-hook member is composed of a hard plastic.

4. A versatile adjustable fastener system comprising:

(a) at least one elastic rope, wherein said rope is between about 0.5 meters and about 50 meters in length, has a substantially circular cross-section with a diameter selected from the class consisting about 9 mm and about 11 mm, is composed of ethylene-propylene-dilene ASTM terpolymer class M synthetic rubber compound, and has an effective temperature range of about −40° F. to about +300° F.;

(b) a plurality of accessory members comprising a tubular portion and a second portion selected from the class consisting of another tubular portion, a hook portion, and an anchor portion; wherein said accessory member composed of a first tubular portion and a second tubular portion is called an extender member, said accessory member composed of a tubular portion and a hook portion is called a hook member, and said accessory member composed of a tubular portion and an anchor portion is called an anchor member;

(c) wherein said tubular portion has walls about 3 mm thick and extends about 44 mm from a proximal end to a distal end, the edge of said proximal end having a shoulder adjacent to the outer wall of said tubular portion and a convex portion between said shoulder and the inner wall of said tubular portion, said shoulder being about 0.1 mm in width and said convex portion being semicircular with a radius of curvature of about 1.8 mm;

(d) wherein said tubular portion includes a flared opening in the wall, having a closed end about 10 mm from said distal end and increasing in width symmetrically about a central line parallel to the axis of said tubular portion from about 1.59 mm at said closed end, to about 2 mm at a point 5 mm from said closed end, to about 2.63 mm at a point 10 mm from said closed end, to about 3.25 mm at a point 15 mm from said closed end, to about 5.63 mm at a point 20 mm from said closed end, to a curve of radius of about 20.63 mm to said distal end;

(e) wherein the edge of said flared opening gradually changes planes from parallel to the axis of said tubular portion at said closed end to coincident with the edge of said distal end;

(f) wherein, the edge of said closed end has a shoulder adjacent to the outer wall of said tubular portion and a convex portion between said shoulder and the inner wall of said tubular portion, said shoulder being about 0.1 mm in width and said convex portion being semicircular with a radius of curvature of about 2.2 mm;

(g) wherein the side profile of said flared opening slopes at an angle of 15° angle from said distal end, gradually changes to a radius of curvature of about 16.25 mm, and to a radius of curvature of about 20.63 mm until said profile becomes coincident with said outer wall of said tubular portion;

(h) wherein said second tubular portion of said extender member is integrally joined to said first tubular portion such that said distal end of said first tubular portion is adjacent to said proximal end of said second tubular portion and said first tubular portion flared opening and said second tubular portion flared opening are opposed (i) wherein said hook portion of said hook member includes a hook element and a rib element; wherein said hook element has a curvilinear shape and a constant thickness of about 2.6 mm until about 1.3 mm from the tip of said hook element, where said thickness decreases in a semicircular curve of radius about 1.3 mm; wherein said hook element is attached to said tubular portion at a point about 7 mm from said proximal end in a line parallel to the axis of said tubular portion and about 125° around from the center line of said flared opening; wherein the width of said hook element is about 17 mm and decreases in width to about 6 mm at about 2.5 mm from said hook tip, where said hook element width decreases in a semicircular curve of radius about 5 mm;

(j) wherein the inner surface of said hook element extends linearly away from said proximal end at an angle of about 11° from the axis of said tubular portion for a distance of about 18.3 mm, then curves closer to parallel to the axis of said tubular portion at a radius of about 14.6 mm, then immediately curves in the opposite direction with a radius of about 8.6 mm through an angle of about 45°, then continues to curve with a radius of about 11.5 mm through an angle of about 180°, then reverses the curve with a radius of about 6 mm through an angle of approximately 90° to about 1.5 mm from said hook element tip;

(k) wherein said rib element has an inner edge and an outer edge, wherein said rib element is symmetrical about the plane that bisects said hook element through its width, and is about 4.5 mm thick, except at said rib element outer edge, where there is a semicircular curve of radius about 3 mm; wherein said rib element inner edge is coincident with said hook element outer surface from the point on said hook element outer surface where it intersects with said outer wall of said tubular portion to a point opposite said final curve of said hook element inner surface; wherein said rib element outer edge follows a curvilinear path, beginning at said distal end, at an angle of about 105° from said outer wall, then curves with a radius of about 17 mm through an angle of about 90°, then with a radius of about 20 mm through an angle of about 45°, then with a radius of about 2 mm until said rib element outer edge makes contact with said hook element outer surface;

(l) wherein said anchor portion of said anchor member is a disk with a diameter of about 43.0 mm and a thickness of about 3.3 mm; wherein said anchor portion has a first mounting hole and a second mounting hole, each with a diameter of about 5.4 mm, that go through said disk from a front face to a rear face; wherein the centers of said mounting holes are located on a diameter line, the center of said first hole being about 5.75 mm from the edge of said disk and the center of said second hole being about 30.5 mm from the center of said first hole;

(m) wherein said disk is attached tangentially to said tubular portion at a line parallel to the axis of said tubular portion and opposite the center line of said flared opening; wherein the attachment point on said disk is a diameter line about perpendicular to the line of said mounting holes, wherein said outer wall of said tubular portion is in contact with said disk rear face, and said disk front face is discontinuous at said tubular portion;

(n) at least one J-hook member including a J-hook portion, a small rib portion, and a large rib portion;

(o) wherein said J-hook portion has a curvilinear shape with a constant thickness from a first surface to a second surface of about 2.8 mm until about 1.4 mm from the small end point and the large end point, where said thickness decreases in a semicircular curve with a radius of about 1.4 mm; wherein the width of said J-hook portion is substantially constant throughout its length at about 10.8 mm until about 5.4 mm from said small and large end points, where said width decreases in a semicircular curve with a radius of about 6 mm;

(p) wherein, from said large end point, said J-hook first surface curves with a radius of about 8.3 mm through an angle of about 100°, then immediately reverses the curve with a radius of about 9.7 mm through an angle of about 215°, then extends linearly for a length of about 24 mm, then turns at an angle of about 38° opposite the direction of said previous curve and extends linearly for a length of about 23 mm, then curves in the same direction as said previous angle with a radius of about 5.8 mm through an angle of about 203°, then extends linearly for a length of about 8 mm, then curves in the opposite direction from said previous curve with a radius of about 6 mm through an angle of about 78°, then extends linearly for a length of about 6.4 mm to about 1.4 mm from said small end point;

(q) wherein said small rib portion has a small rib inner edge and a small rib outer edge; wherein said small rib portion is symmetrical about the plane that bisects said J-hook portion through its width, and is about 3.8 mm thick, except at said small rib outer edge, where it forms a semicircular curve of about a 3 mm radius; wherein said small rib inner edge is coincident with said J-hook first surface from said 38° turn of said J-hook first surface to about halfway along the 5.8 mm radius curve of the said J-hook first surface; wherein said small rib outer edge follows a curvilinear path beginning at said 38° turn of said J-hook first surface, extending linearly from said J-hook first surface for a length of about 5.6 mm, then turns at an angle of about 38° toward said J-hook first surface and extends linearly for a length of about 19 mm, then curves toward said J-hook first surface with a radius of about 7.2 mm until said small rib outer edge makes contact with said J-hook first surface;

(r) wherein said large rib portion has a large rib inner edge and a large rib outer edge; wherein said large rib portion is symmetrical about the plane that bisects said J-hook portion through its width, and is about 3.8 mm thick, except at the large rib outer edge, where it forms a semicircular curve of about a 3 mm radius; wherein said large rib inner edge is coincident with said J-hook second surface from a point about 8 mm from said large end point to the point opposite said 38° angle of said J-hook first surface; wherein said large rib outer edge follows a curvilinear path beginning at said J-hook second surface about 8 mm from said large end point, curving away from said J-hook second surface with a radius of about 5 mm through an angle of about 90°, then reversing the curve with a radius of about 15.5 mm through an angle of about 130°, continues with a radius of about 17.7 mm through an angle of about 137°, then extends linearly until it contacts said J-hook second surface;

(s) wherein said extender member, said hook member, said anchor member, and said J-hook member are composed of polyhexamethylene adipamide and have an effective temperature range of about −40° F. to about +220° F.

5. An extender accessory member comprising:

(a) a first tubular portion and a second tubular portion;

(b) wherein said tubular portion has walls about 3 mm thick and extends about 44 mm from a proximal end to a distal end, the edge of said proximal end having a shoulder adjacent to the outer wall of said tubular portion and a convex portion between said shoulder and the inner wall of said tubular portion, said shoulder being about 0.1 mm in width and said convex portion being semicircular with a radius of curvature of about 1.8 mm;

(c) wherein said tubular portion includes a flared opening in the wall, having a closed end about 10 mm from said distal end and increasing in width symmetrically about a central line parallel to the axis of said tubular portion from about 1.59 mm at said closed end, to about 2 mm at a point 5 mm from said closed end, to about 2.63 mm at a point 10 mm from said closed end, to about 3.25 mm at a point 15 mm from said closed end, to about 5.63 mm at a point 20 mm from said closed end, to a curve of radius of about 20.63 mm to said distal end;

(d) wherein the edge of said flared opening gradually changes planes from parallel to the axis of said tubular portion at said closed end to coincident with the edge of said distal end;

(e) wherein, the edge of said closed end has a shoulder adjacent to the outer wall of said tubular portion and a convex portion between said shoulder and the inner wall of said tubular portion, said shoulder being about 0.1 mm in width and said convex portion being semicircular with a radius of curvature of about 2.2 mm;

(f) wherein the side profile of said flared opening slopes at an angle of 15° angle from said distal end, gradually changes to a radius of curvature of about 16.25 mm, and to a radius of curvature of about 20.63 mm until said profile becomes coincident with said outer wall of said tubular portion;

(g) wherein said second tubular portion of said extender member is integrally joined to said first tubular portion such that said distal end of said first tubular portion is adjacent to said proximal end of said second tubular portion and said first tubular portion flared opening and said second tubular portion flared opening are opposed (h) wherein said extender member is composed of polyhexamethylene adipamide and has an effective temperature range of about −40° F. to about +220° F.

6. A hook accessory member comprising:

(a) a tubular portion and a hook portion;

(b) wherein said tubular portion has walls about 3 mm thick and extends about 44 mm from a proximal end to a distal end, the edge of said proximal end having a shoulder adjacent to the outer wall of said tubular portion and a convex portion between said shoulder and the inner wall of said tubular portion, said shoulder being about 0.1 mm in width and said convex portion being semicircular with a radius of curvature of about 1.8 mm;

(c) wherein said tubular portion includes a flared opening in the wall, having a closed end about 10 mm from said distal end and increasing in width symmetrically about a central line parallel to the axis of said tubular portion from about 1.59 mm at said closed end, to about 2 mm at a point 5 mm from said closed end, to about 2.63 mm at a point 10 mm from said closed end, to about 3.25 mm at a point 15 mm from said closed end, to about 5.63 mm at a point 20 mm from said closed end, to a curve of radius of about 20.63 mm to said distal end;

(d) wherein the edge of said flared opening gradually changes planes from parallel to the axis of said tubular portion at said closed end to coincident with the edge of said distal end;

(e) wherein, the edge of said closed end has a shoulder adjacent to the outer wall of said tubular portion and a convex portion between said shoulder and the inner wall of said tubular portion, said shoulder being about 0.1 mm in width and said convex portion being semicircular with a radius of curvature of about 2.2 mm;

(f) wherein the side profile of said flared opening slopes at an angle of 15° angle from said distal end, gradually changes to a radius of curvature of about 16.25 mm, and to a radius of curvature of about 20.63 mm until said profile becomes coincident with said outer wall of said tubular portion;

(g) wherein said hook portion includes a hook element and a rib element; wherein said hook element has a curvilinear shape and a constant thickness of about 2.6 mm until about 1.3 mm from the tip of said hook element, where said thickness decreases in a semicircular curve of radius about 1.3 mm; wherein said hook element is attached to said tubular portion at a point about 7 mm from said proximal end in a line parallel to the axis of said tubular portion and about 125° around from the center line of said flared opening; wherein the width of said hook element is about 17 mm and decreases in width to about 6 am at about 2.5 mm from said hook tip, where said hook element width decreases in a semicircular curve of radius about 5 mm;

(h) wherein the inner surface of said hook element extends linearly away from said proximal end at an angle of about 11° from the axis of said tubular portion for a distance of about 18.3 mm, then curves closer to parallel to the axis of said tubular portion at a radius of about 14.6 mm, then immediately curves in the opposite direction with a radius of about 8.6 mm through an angle of about 45°, then continues to curve with a radius of about 11.5 mm through an angle of about 180°, then reverses the curve with a radius of about 6 mm through an angle of approximately 90° to about 1.5 mm from said hook element tip;

(i) wherein said rib element has an inner edge and an outer edge, wherein said rib element is symmetrical about the plane that bisects said hook element through its width, and is about 4.5 mm thick, except at said rib element outer edge, where there is a semicircular curve of radius about 3 mm; wherein said rib element inner edge is coincident with said hook element outer surface from the point on said hook element outer surface where it intersects with said outer wall of said tubular portion to a point opposite said final curve of said hook element inner surface; wherein said rib element outer edge follows a curvilinear path, beginning at said distal end, at an angle of about 105° from said outer wall, then curves with a radius of about 17 mm through an angle of about 90°, then with a radius of about 20 mm through an angle of about 45°, then with a radius of about 2 mm until said rib element outer edge makes contact with said hook element outer surface;

(j) wherein said hook member is composed of polyhexamethylene adipamide and has an effective temperature range of about −40° F. to about +220°F.

7. A J-hook accessory member comprising:

(a) a J-hook portion, a small rib portion, and a large rib portion;

(b) wherein said J-hook portion has a curvilinear shape with a constant thickness from a first surface to a second surface of about 2.8 mm until about 1.4 mm from the small end point and the large end point, where said thickness decreases in a semicircular curve with a radius of about 1.4 mm; wherein the width of said J-hook portion is substantially constant throughout its length at about 10.8 mm until about 5.4 mm from said small and large end points, where said width decreases in a semicircular curve with a radius of about 6 mm;

(c) wherein, from said large end point, said J-hook first surface curves with a radius of about 8.3 mm through an angle of about 100°, then immediately reverses the curve with a radius of about 9.7 mm through an angle of about 215°, then extends linearly for a length of about 24 mm, then turns at an angle of about 38° opposite the direction of said previous curve and extends linearly for a length of about 23 mm, then curves in the same direction as said previous angle with a radius of about 5.8 mm through an angle of about 203°, then extends linearly for a length of about 8 mm, then curves in the opposite direction from said previous curve with a radius of about 6 mm through an angle of about 78°, then extends linearly for a length of about 6.4 mm to about 1.4 mm from said small end point;

(d) wherein said small rib portion has a small rib inner edge and a small rib outer edge; wherein said small rib portion is symmetrical about the plane that bisects said J-hook portion through its width, and is about 3.8 mm thick, except at said small rib outer edge, where it forms a semicircular curve of about a 3 mm radius; wherein said small rib inner edge is coincident with said J-hook first surface from said 38° turn of said J-hook first surface to about halfway along the 5.8 mm radius curve of the said J-hook first surface; wherein said small rib outer edge follows a curvilinear path beginning at said 38° turn of said J-hook first surface, extending linearly from said J-hook first surface for a length of about 5.6 mm, then turns at an angle of about 38° toward said J-hook first surface and extends linearly for a length of about 19 mm, then curves toward said J-hook first surface with a radius of about 7.2 mm until said small rib outer edge makes contact with said J-hook first surface;

(e) wherein said large rib portion has a large rib inner edge and a large rib outer edge; wherein said large rib portion is symmetrical about the plane that bisects said J-hook portion through its width, and is about 3.8 mm thick, except at the large rib outer edge, where it forms a semicircular curve of about a 3 mm radius; wherein said large rib inner edge is coincident with said J-hook second surface from a point about 8 mm from said large end point to the point opposite said 38° angle of said J-hook first surface; wherein said large rib outer edge follows a curvilinear path beginning at said J-hook second surface about 8 mm from said large end point, curving away from said J-hook second surface with a radius of about 5 mm through an angle of about 90°, then reversing the curve with a radius of about 15.5 mm through an angle of about 130°, continues with a radius of about 17.7 mm through an angle of about 137°, then extends linearly until it contacts said J-hook second surface;

(f) wherein said J-hook member is composed of polyhexamethylene adipamide and has an effective temperature range of about −40° F. to about +220° F.

8. A versatile adjustable fastener system comprising:

(a) at least one elastic rope, wherein said rope has a substantially circular cross-section with a diameter selected from the class consisting about 9 mm and about 11 mm, and is composed of a synthetic rubber compound;

(b) at least one extender accessory member including a first tubular portion and a second tubular portion;

(c) wherein said first tubular portion and said second tubular portion each have walls about 3 mm thick and extend about 44 mm from a proximal end to a distal end;

(d) wherein said first tubular portion and said second tubular portion each include a flared opening in the wall, having a closed end about 10 mm from said distal end and increasing gradually in width symmetrically about a central line parallel to the axis of said tubular portion from about 1.59 mm at said closed end to the width of said tubular portion at said distal end;

(e) wherein the edge of said flared opening gradually changes planes from parallel to the axis of said tubular portion at said closed end to coincident with the edge of said distal end;

(f) wherein the side profile of said flared opening slopes gradually from said distal end, gradually changing the radius of curvature until said profile becomes coincident with said outer wall of said tubular portion;

(g) wherein said second tubular portion of said extender member is integrally joined to said first tubular portion such that said distal end of said first tubular portion is adjacent to said proximal end of said second tubular portion and said first tubular portion flared opening and said second tubular portion flared opening are opposed; and (h) wherein said extender member is composed of a hard plastic.

9. A versatile adjustable fastener system comprising:

(a) at least one elastic rope, wherein said rope has a substantially circular cross-section with a diameter selected from the class consisting about 9 mm and about 11 mm, and is composed of a synthetic rubber compound;

(b) at least one hook accessory member including a tubular portion and a hook portion;

(c) wherein said tubular portion has walls about 3 mm thick and extends about 44 mm from a proximal end to a distal end;

(d) wherein said tubular portion includes a flared opening in the wall, having a closed end about 10 mm from said distal end and increasing gradually in width symmetrically about a central line parallel to the axis of said tubular portion from about 1.59 mm at said closed end to the width of said tubular portion at said distal end;

(e) wherein the edge of said flared opening gradually changes planes from parallel to the axis of said tubular portion at said closed end to coincident with the edge of said distal end;

(f) wherein the side profile of said flared opening slopes gradually from said distal end, gradually changing the radius of curvature until said profile becomes coincident with said outer wall of said tubular portion;

(g) wherein said hook portion includes a hook element and a rib element; wherein said hook element has substantially an "S" shape and a constant thickness of about 2.6 mm; wherein said hook element is attached to said tubular portion at a point about 7 mm from said proximal end in a line parallel to the axis of said tubular portion and about 125° around from the center line of said flared opening; wherein the width of said hook element is about 17 mm and decreases in width to about 6 mm;

(h) wherein said rib element has an inner edge and an outer edge, wherein said rib element is symmetrical about the plane that bisects said hook element through its width, and is about 4.5 mm thick; wherein said rib element inner edge is coincident with said hook element outer surface from the point on said hook element outer surface where it intersects with said outer wall of said tubular portion to a point opposite said final curve of said hook element inner surface; wherein said rib element outer edge follows a curvilinear path; and (i) wherein said hook member is composed of a hard plastic.

10. A versatile adjustable fastener system comprising:

(a) at least one elastic rope, wherein said rope has a substantially circular cross-section with a diameter selected from the class consisting about 9 mm and about 11 mm, and is composed of a synthetic rubber compound;

(b) at least one anchor accessory member including a tubular portion and an anchor portion;

(c) wherein said tubular portion has walls about 3 mm thick and extends about 44 mm from a proximal end to a distal end;

(d) wherein said tubular portion includes a flared opening in the wall, having a closed end about 10 mm from said distal end and increasing gradually in width symmetrically about a central line parallel to the axis of said tubular portion from about 1.59 mm at said closed end to the width of said tubular portion at said distal end;

(e) wherein the edge of said flared opening gradually changes planes from parallel to the axis of said tubular portion at said closed end to coincident with the edge of said distal end;

(f) wherein the side profile of said flared opening slopes gradually from said distal end, gradually changing the radius of curvature until said profile becomes coincident with said outer wall of said tubular portion;

(g) wherein said anchor portion is a disk with a first mounting hole and a second mounting hole;

(h) wherein said disk is attached tangentially to said tubular portion opposite the center line of said flared opening; and (i) wherein said anchor member is composed of a hard plastic.

* * * * *